March 12, 1935.  M. BURGER  1,994,241
CARTON CLOSING MEANS
Filed Dec. 24, 1931   6 Sheets-Sheet 1
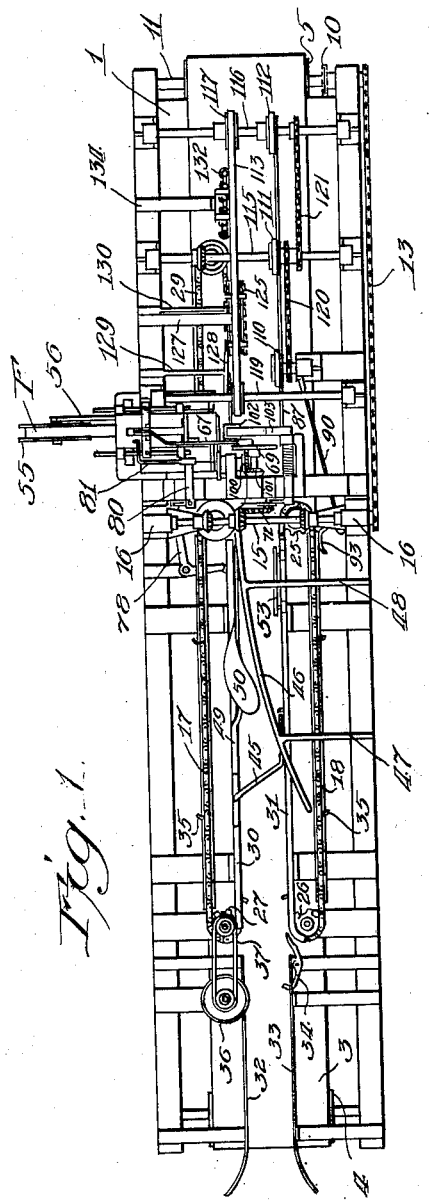
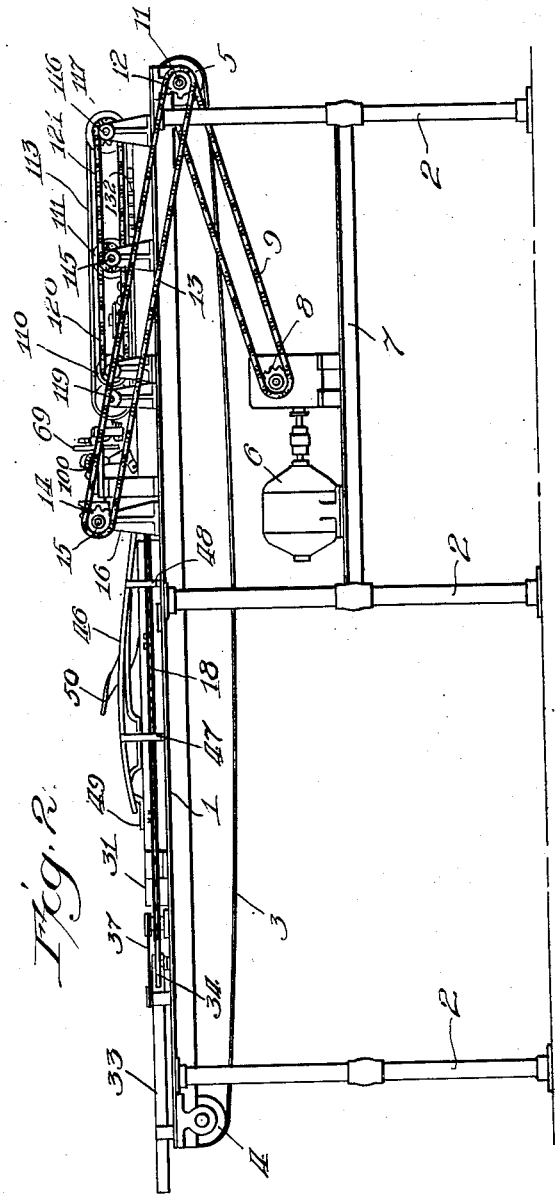
INVENTOR.
Martin Burger,
By Cromwell, Treist & Warden
ATTORNEYS.

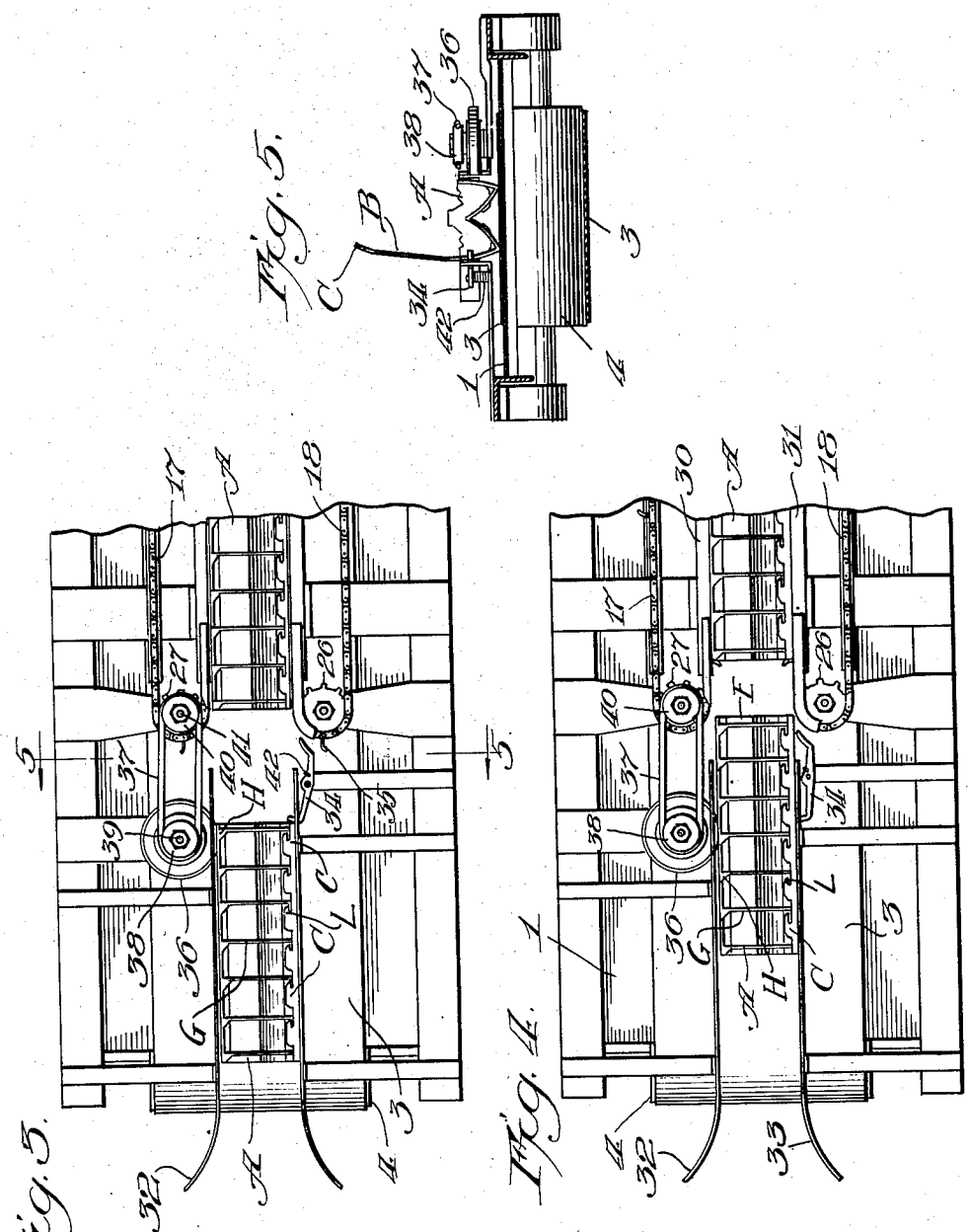

March 12, 1935.  M. BURGER  1,994,241
CARTON CLOSING MEANS
Filed Dec. 24, 1931  6 Sheets-Sheet 3
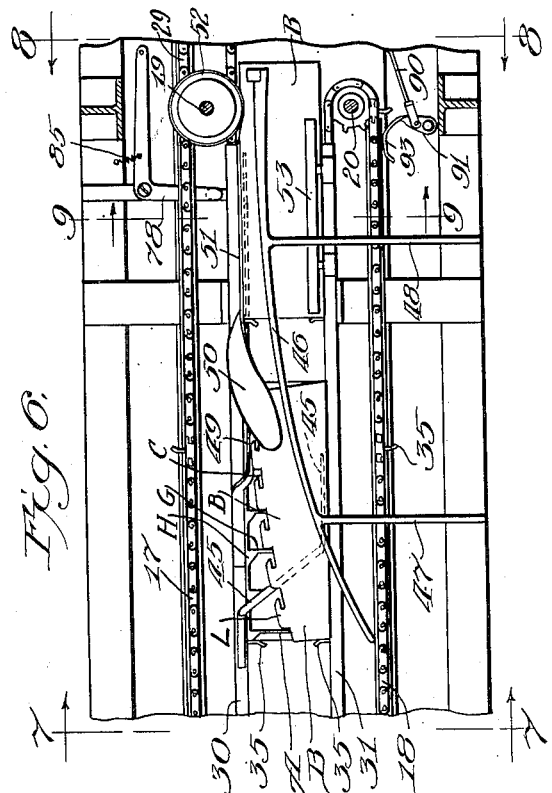
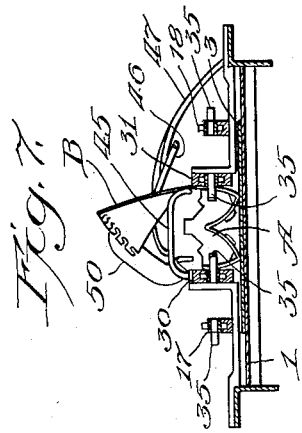
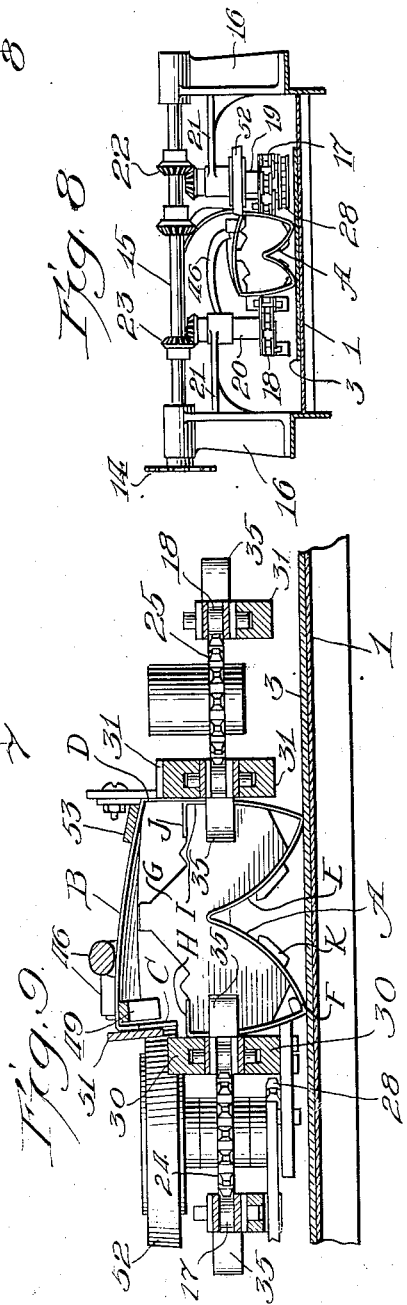
INVENTOR.
Martin Burger,
By Cromwell, Treust + Warden
ATTORNEYS.

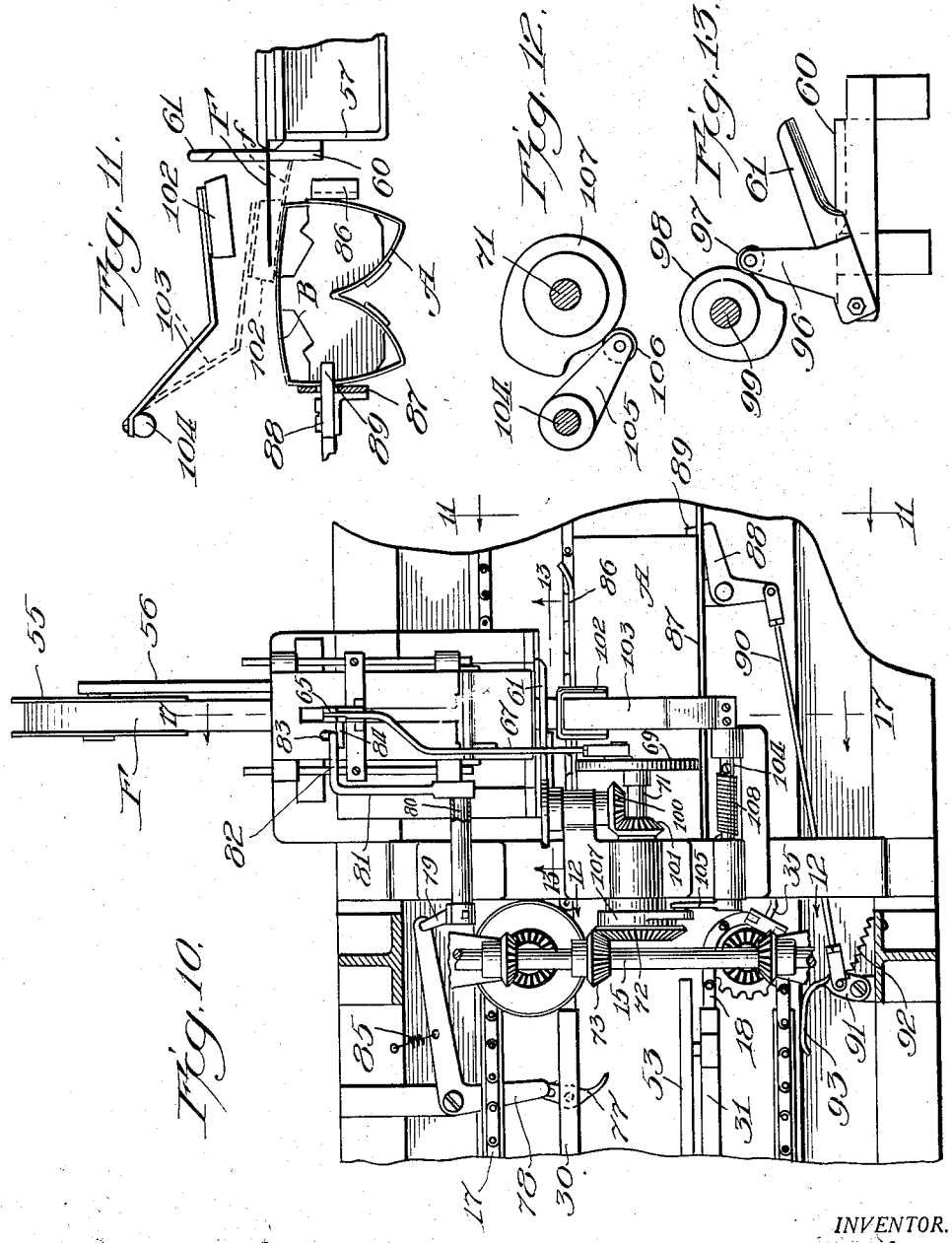

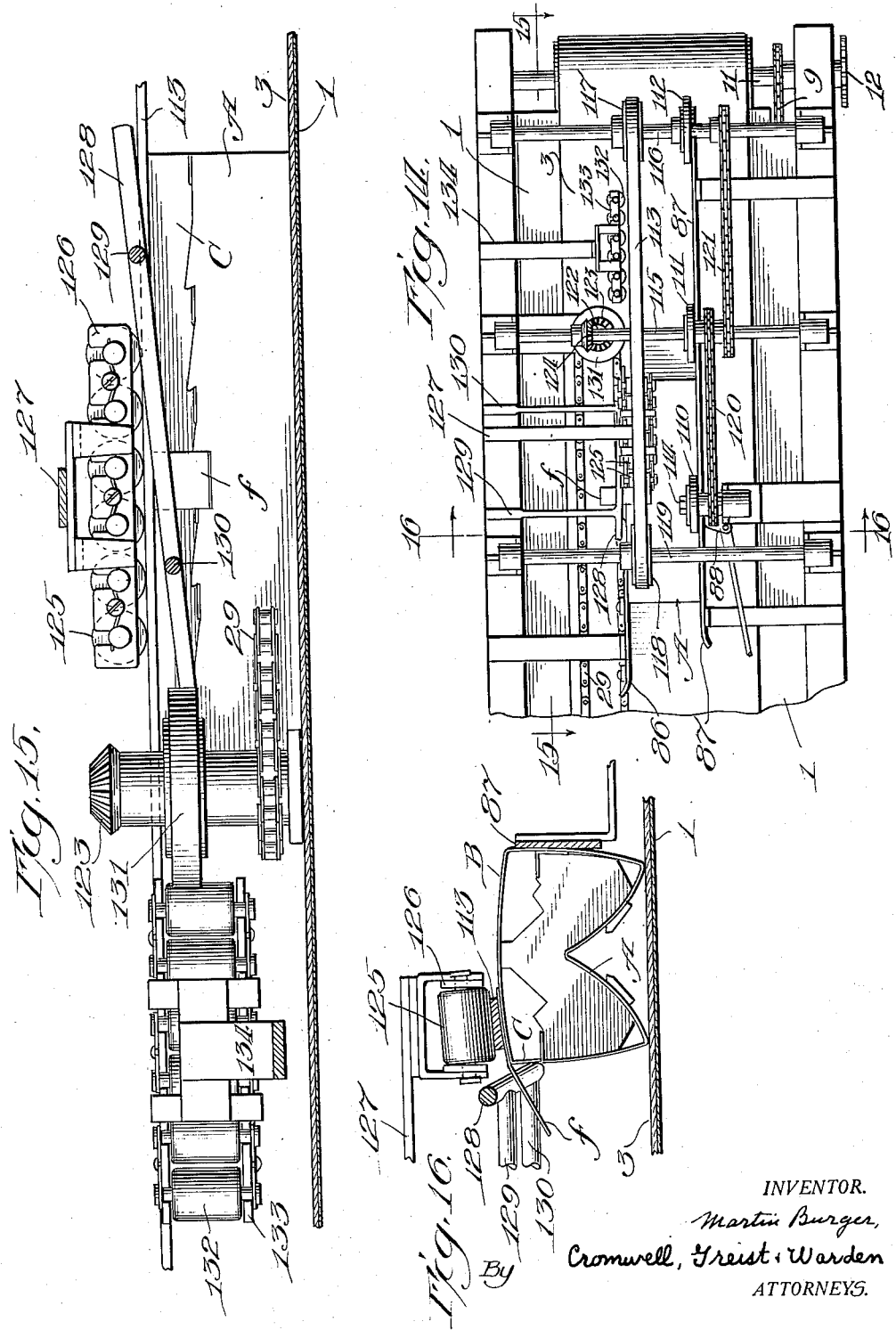

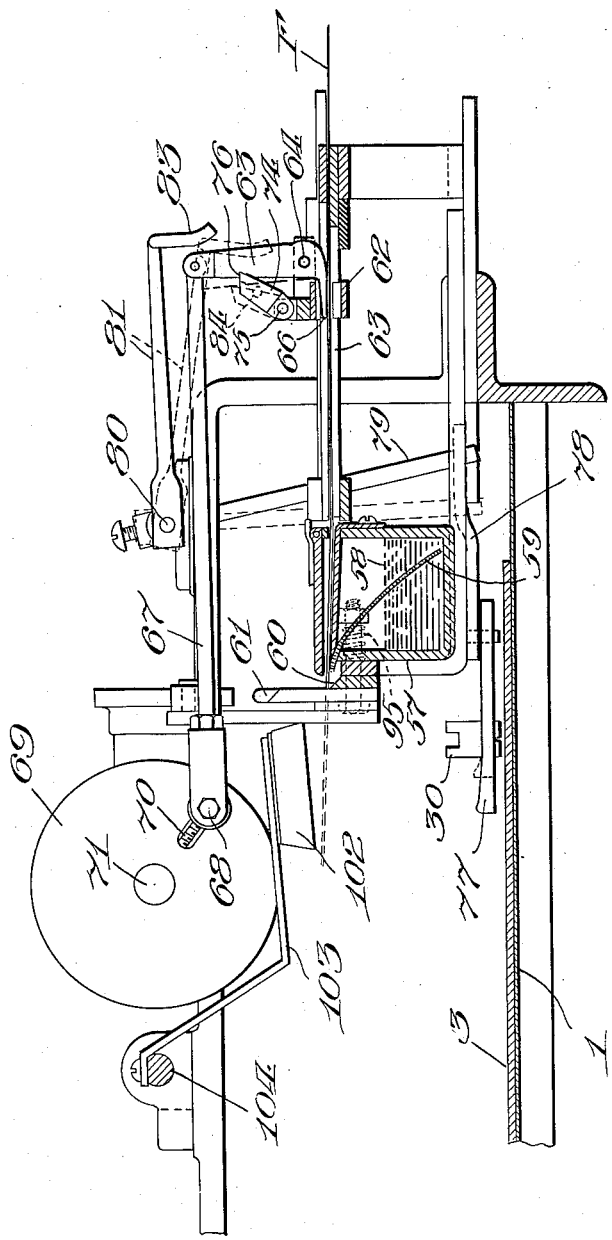

Patented Mar. 12, 1935

1,994,241

UNITED STATES PATENT OFFICE 1,994,241

CARTON CLOSING MEANS

Martin Burger, Morris, Ill., assignor to Self-Locking Carton Company, Chicago, Ill., a corporation of Illinois Application December 24, 1931, Serial No. 583,055

10 Claims. (Cl. 93—6)

The present invention has for its object to produce a simple and efficient machine for rapidly closing the covers of cartons, especially cartons that have been filled with eggs.

A further object of the present invention is to produce a simple, novel and efficient machine which will not only close a carton, but will also apply a wafer or other suitable element to seal it in its closed condition.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of a machine embodying the present invention; Fig. 2 is a side view; Figs. 3 and 4 are views similar to Fig. 1, on a larger scale, showing only the left-hand or inlet end, and illustrating the manner of controlling the entry of the cartons; Fig. 5 is a section on line 5—5 of Fig. 3; Fig. 6 may be regarded as either a plan view with parts broken away, or as a horizontal section, on the same scale as Figs. 3 and 4, showing that portion of the machine in which the covers of the cartons are folded down or closed; Fig. 7 is a section on line 7—7 of Fig. 6; Fig. 8 is a section on line 8—8 of Fig. 6; Fig. 9 is a section on line 9—9 of Fig. 6, on a larger scale than Figs. 7 and 8; Fig. 10 is a top plan view, on the same scale as Fig. 9, of that part of the machine beginning with the right-hand portion of Fig. 6 and continuing for a short distance farther; Fig. 11 is a section on line 11—11 of Fig. 10 only fragments of the machine, together with a carton positioned therein, being shown; Fig. 12 is a section on line 12—12 of Fig. 10 showing only the cam and the element operated thereby; Fig. 13 is a section on line 13—13 of Fig. 10, showing only the shearing mechanism and the cam for driving it; Fig. 14 is a top plan view, on the same scale as Figs. 3, 4 and 6, of the outlet end of the machine, or the right-hand end, as it appears in Fig. 1; Fig. 15 is a section on line 15—15 of Fig. 14, but on a larger scale; Fig. 16 is a section on line 16—16 of Fig. 14, on the same scale as Fig. 15, showing only those parts of the machine which, in the plane on which the section is taken, engage with the carton; and Fig. 17 is a section, on a larger scale, on line 17—17 of Fig. 10, only fragments of the machine being shown.

In the drawings, I have illustrated my invention as applied to a machine for closing and sealing a well-known type of egg carton and, for the sake of brevity, the detailed description will be confined to this embodiment, although my invention is not limited to this particular use.

The particular carton A shown in the drawings is of the one-piece type and is formed by suitably cutting, scoring and folding a blank of cardboard or similar material to form in the order named a marginal portion or cover-locking strip C, a cover B, a rear wall D, a bottom section E, a front wall F, a series of cross partitions G attached to the front wall by means of triangular pieces or hinge portions H and a cover-locking strip I attached to the opposite sides of the cross partitions G by means of triangular hinges J and being folded over and glued to the rear wall as will be seen in Fig. 9, for example. The bottom wall of the carton is drawn up along its central portion and secured in substantially inverted V-shape to the cross partitions by means of hooks K engaging the bottom portion through suitable openings therein. Along the free edge of the cover-locking strip C are provided a series of cover-locking hooks L which are adapted to be engaged beneath the hinge portions H to interlock the cover B in closed position. In closing the carton the cover B is rotated about its line of attachment to the rear wall into substantially horizontal position and the cover-locking strip C is pressed downwardly and inwardly of the carton, as shown in Fig. 9, so that the hooks L may be depressed beneath the triangular hinges H. Once the hooks are beneath the triangular hinges H the natural resiliency of the cover-locking strip C causes the latter to spring outwardly to a position adjacent the front wall of the carton in which the hooks are engaged beneath the triangular hinges H, thereby completing the cover-locking operation. This method of interlock has been practiced for many years by hand operation but heretofore no one has been able to provide a machine which will accomplish the same result.

Referring to the drawings, 1 represents a long, horizontal bed or table shown as being supported upon standards 2, 2. A long, flexible endless belt 3 has its upper run lying upon the bed or table and extending from one end to the other, whereas the lower run lies underneath the table. At the ends of the table are transverse rolls 4 and 5 over which the endless belt or conveyor runs.

The power for driving the machine is derived from an electric motor 6 set on a platform or shelf 7 underneath the bed of the machine. The motor drives a speed-reducing mechanism of which the last element is a sprocket wheel 8. A sprocket chain 9 passing over this wheel and over a wheel 10 on the shaft 11 of the roller 5 serves as a direct drive for the belt. On the shaft 11 is a second sprocket wheel 12. A sprocket chain 13 extends around the sprocket wheel 12 and around a sprocket wheel 14 fixed upon a transverse shaft 15 located toward the middle of the machine and at some distance above the table. The shaft 15 is conveniently mounted in pedestals 16, 16 fixed to and rising from the table at opposite sides thereof. Two endless sprocket chains 17 and 18, overlying the table in spaced relation to each other and extending lengthwise of the table, are driven from the shaft 15. As perhaps best shown in Fig. 8, there are two short vertical shafts 19 and 20 beneath the shaft 15, these vertical shafts being supported and journalled in brackets 21 extending inwardly from the pedestals 16. Each of the shafts 19 and 20 is driven from the shaft 15 through beveled gearing, indicated as a whole at 22 and 23. The sprocket chains 17 and 18 engage with sprocket wheels 24 and 25, respectively, on the lower ends of the shafts 19 and 20; these sprocket wheels being best shown in Fig. 9. The sprocket chains 17 and 18 extend from the sprocket wheels 24 and 25, respectively, to and around sprocket wheels 26 and 27 located a short distance from the inlet end of the machine. On the lower end of the shaft 19 is a sprocket wheel 28 around which passes a sprocket chain 29 that extends toward the discharge end of the machine, for a purpose to be hereinafter explained.

The inner runs of the sprocket chains 17 and 18 are spaced apart a distance slightly greater than the width of the cartons to be closed, and underlie stationary longitudinal guide rails 30 and 31. Forwardly from the guide rails 30 and 31, that is, to the left thereof, as shown in Fig. 1, are two short guides 32 and 33 between which a carton to be closed may be set so as to rest upon the belt or conveyor. A rocking dog 34 is mounted on a stationary part of the machine so that one end projects into the gap between the rails 31 and 33, whereas the other end, in certain positions of the dog, projects into the space between the guides 32 and 33, or into the path of a carton entered between these guides. On the sprocket chains 17 and 18 are projecting fingers 35 spaced apart from each other a distance somewhat greater than the length of a carton. Whenever one of the fingers on the chain 18 travels around the sprocket wheel 26, it strikes the adjacent end of the dog 34 and swings the dog into the position that brings its other end clear of the space through which the carton must pass. In other words, the sprocket chains being driven in such directions that their inner runs will travel toward the right, as viewed in Fig. 1, then, when a carton A is set on the belt or conveyor between the guides 32 and 33 in the position occupied by the left-hand carton in Fig. 3, it will be seen that the dog 34 acts as a stop to prevent the carton from moving ahead. However, when one of the fingers 35 on the chain 18 trips the dog, the carton will advance.

While the belt or conveyor will carry the cartons ahead as long as no considerable resistance is encountered, it is necessary positively to drive the cartons while work is being done on the same. Therefore, after a carton has been moved into position between the chains 17 and 18, the driving of the carton is thereafter done by the fingers on the chains, the fingers engaging with the rear or trailing end of the carton.

I prefer not to rely entirely on the belt or conveyor for moving the cartons into position between the driving sprocket chains after being released from the dog. I have, therefore, provided a friction wheel 36 rotatable about a vertical axis outwardly from the guide 32, but extending inwardly far enough past the guide firmly to engage the side wall of a carton and press the carton against the opposite guide. This friction wheel is driven by a belt 37 passing around a wheel or pulley 38 on a shaft 39 that carries the wheel 36, and around a second pulley 40 on the shaft 41 of the sprocket wheel 27.

As best shown in Fig. 5, there is a torsion spring 42 connected with the dog 34 and tending constantly to hold the dog in its working position. Therefore, when the dog is pushed out of the way by one of the fingers 35, it is essential that the left-hand carton be promptly moved ahead before the dog springs back; this being successfully accomplished by the friction wheel 36, so that, by the time the dog is released from the actuating finger therefor, the side of the box is presented to it and it simply rides along on the side of the box or carton until it drops off the trailing end of the latter.

After a carton has been carried ahead a short distance by the chains 17 and 18, its cover B is swung down and closed. The means for doing this are best shown in Figs. 1 and 2 and in Figs. 6 to 9. A rod 45, fixed at one end to the top of the guide rail 30, extends diagonally across the space between the guides 30 and 31 at a height sufficient to permit the body of the carton to pass underneath the same. When it reaches the vicinity of the guide 31, the rod is bent so as to lie parallel with this guide at an elevation above the belt or conveyor equal to the height of that wall of the carton that engages with the guide rail 31 and has projecting therefrom the cover B. Consequently, as the cover is pressed down, the end portion of the rod 45 will act as a gauge to determine the line along which the cover is bent or folded. The actual bending down or folding of the cover is done by two separate agents. One of these agents is a long bar 46 extending across the top of the guide rail 31 and toward the guide rail 30. The curvature of this bar is gradual so that, viewed from above, it makes only a small angle with the guide rails. Viewed from the side of the machine, the bar drops gradually after crossing the guide rail 31. This bar is shown as being carried on the ends of two supports 47 and 48 rising from a stationary part of the frame of the machine at one side of the machine. As the carton is moved ahead by the chains, the cover engages with the bar and is gradually deflected by the bar 46 until it has been brought down to its closed position.

It is not enough that the cover be swung down, but a marginal portion adjacent the long free edge of the cover must be bent downwardly with respect to the body portion of the cover so as to produce a flange or cover-locking strip, indicated at C in Fig. 9, that may be inserted into the body of the carton, or at least be brought beside the adjacent side wall of the carton.

This bending of the cover to produce the locking flange is accomplished by turning the edge of the cover over a long stationary bar 49 fixed upon the guide rail 30 and extending above and parallel with the same, as viewed from the top of the machine. The free portion of the bar 49 is close to the guide rail and, as the free end of the rod 45 determines the hinge axis of the cover, so the free end of the bar 49 determines the line of fold of the cover to produce the flange. Suitable means must be provided to bend the cover over the bar 49. In the arrangement shown, such means consists of a curved wing or deflector 50 mounted on top of the guide rail 30 and curving inwardly toward the longitudinal center of the machine and lengthwise toward the inlet end of the machine. The curved wing or deflector 50 bends the edge of the cover down over the underlying bar 49 as the carton moves ahead, producing the flange C which enters a narrow space between the bar 49 and a long vertical ledge 51 forming a continuation of the member 50 but extending parallel with the free end of the bar 49. In the particular arrangement shown, the flange on the cover must be moved down into the carton on the inner side of what may be termed the front wall. Therefore, the free edge of this flange must be carried inward out of registration with the front wall of the carton. To this end, as best shown in Fig. 9, I have so positioned the members 49 and 51 that they hold the flange with its free edge lying well inwardly from the corresponding side wall of the carton.

The carton is of the well-known type in which the flange on the cover has hooks that enter beneath horizontal triangular pieces or hinges at the top of what is termed the front wall of the carton. Therefore, by positioning the flange, as shown in Fig. 9, before the cover is completely lowered, the hooks are brought into position to interlock with the triangular pieces on the carton when the cover is fully pressed down.

As the flange on the cover of the carton passes beyond the ends of the bar 49 and the member 51, the flange is engaged by a horizontal wheel 52 on the shaft 19 that pushes the flange still farther in as the cover is being forced down into its final position by the end portion of the member 46, as shown in Fig. 8 and at the right hand in Fig. 6. That is, the hook portions, which normally are in alignment with the triangular hinge portions H, are pressed inwardly out of alignment with the hinge portions so that the hooks may then be moved downwardly and into engagement with the hinge portions. If the hooks were not first moved out of alignment with the triangular hinge portions the hooks would be damaged when subsequently pressed downwardly against the triangular hinges.

In order to maintain the sharp corner at the hinge axis of the cover, I provide a holding bar 53 lying just inside of the guide 31 just beyond the curved deflector 50 and at such an elevation that, as the almost completely closed carton travels underneath the bar, the hinged side of the cover is pressed firmly down.

After the carton has passed beyond the wheel 52, it is in a closed condition, the cover being locked down. It is frequently desirable, however, to seal the cartons so that they cannot be opened without leaving visible evidence of the fact. I have, therefore, provided means for attaching a wafer or the like over the front top corner, namely, over the corner between the free end of the cover and the adjacent wall of the carton. The mechanism for accomplishing this purpose is located above the bed of the machine just beyond and driven by the transverse shaft 15.

The sealing means is in the form of a strip F wound on a reel 55 mounted on a bracket 56 for rotation about an axis parallel with the longitudinal axis of the machine. The free end of this strip is drawn inwardly across the machine over the top of a well 57 adapted to contain water 58, as best shown in Fig. 17. The strip is provided with a gum coating on the side that is the under side in the position shown in Fig. 17. In the well is a wick 59 that engages with the under side of the strip and wets the gum or glue as the strip is moved over the wick. The well is spaced apart some distance from the path of travel of the cartons, and it has on its inner side a stationary shear blade 60 adapted to cooperate with a swinging shear blade 61 to sever the strip. It will thus be seen that, if the strip can be fed in proper time relation to the cartons, its free end can be brought above each carton after the latter has been properly positioned, and then a section, at the free end, can be cut from the strip by the shears. The part of the seal or wafer thus produced, that lies above the carton, can be pressed down on the carton so as to adhere thereto. Then, the overhanging portion of the wafer or seal can be bent down and pressed into engagement with the front wall of the carton.

The feeding of the strip is effected by a suitable gripper driven in proper time relation to the movements of the cartons; the gripper taking hold of the strip and drawing a predetermined length inwardly upon each working stroke, and then making its return stroke independently of the strip. As best shown in Fig. 17, the strip passes through a slotted cross head 62 movable transversely of the machine along guides 63. Pivoted at its lower end to the cross head, as indicated at 64, is a short upright lever 65 having at the lower end a long thin finger 66 extending into the slot in the cross head above the strip. The lever 65 lies on the outer side of the cross head and the finger thereon, therefore, extends inwardly toward the longitudinal center of the machine. It will be seen that, if a pull is exerted on the upper end of the lever in the direction of the longitudinal center of the machine, the first thing that will occur will be that the finger 66 presses down on the strip F, whereby the strip is clamped between the lower part of the cross head and the finger. A further pull on the lever will then carry the cross head inwardly, the strip moving with the crosshead and being, therefore, fed toward the cartons. In the arrangement shown, the lever 65 is actuated by a connecting rod 67 extending from the upper end of the lever to a crank pin 68 on a driving disk 69; the crank pin being adjustable radially of the disk by means of a screw device 70, to permit the length of stroke of the connecting rod to be varied. As best shown in Fig. 10, the disk 69 is carried on one end of a short shaft 71 extending in the direction of the length of the machine at about the longitudinal center. On this shaft is a large bevel gear wheel 72 meshing with a bevel pinion 73 on the shaft 15. Therefore, as the shaft 15 revolves, it also revolves the disk 69 and causes the strip or tape-feeding device to be moved back and forth. It will, of course, be understood that, when the connecting rod starts to travel toward the right, as viewed in Fig. 17, it swings the lever 65 in the counter-clockwise direction, raising the finger from the tape and permitting the lever and cross head to make their return stroke while the strip or tape remains in the position into which it was brought upon the preceding working stroke.

It is not desirable that the strip of sealing material be fed when there is no carton present to be sealed. I have, therefore, provided means to prevent the feeding of the strip except at times when there will be cartons to receive the free end of the strip. This is accomplished, as best shown in Fig. 17, by providing a dog in the form of a pawl 74 pivoted at its lower end, as indicated at 75, to the cross head inwardly from the lever 65, and normally engaged at its upper end in a notch 76 in the inner edge of this lever; the parts being so proportioned that, when the pawl is in the notch, the finger 66 on the lever is held out of contact with the strip F and, therefore, no feeding movement of the strip will occur, when the cross head is moved through a working stroke. In order to make the working stroke effective to feed the strip, the locking dog or pawl must be tripped. This tripping is done by a carton approaching the seal-receiving position. As best shown in Fig. 10, there is pivotally supported on the guide rail 30, about a carton length short of the seal-receiving position of the cartons, a rocker device 77 that extends into the path of an advancing carton. This rocker device is connected to one arm of a bell crank lever 78 which, as shown in Fig. 17, lies below the well 57. The bell crank lever is connected to the depending arm 79 fixed to a short rock shaft 80 extending longitudinally of the machine. On this rock shaft is a second radial arm 81 extending outwardly beside the strip feeding mechanism. The outer end of the arm 81 is bent parallel with the direction of the length of the machine, as indicated at 82, and then downwardly, as indicated at 83. When a carton comes along and operates the rocker device 77, the result is to cause the arm 81 on the rocker shaft 80 to be swung down from the full line position, shown in Fig. 17, to the dotted line position. When in the dotted line position, the part or finger 83 lies in the path of a pin 84 projecting from the side of the dog or pawl 74. The operation is as follows: When there is a carton in the machine nearing the sealing position, it causes the finger 83 to be brought into the dotted line position in Fig. 17, whereupon, as the cross head completes its return stroke, the pin 84 on the locking dog or pawl will strike the finger 83 and cause the lever 65 to be released. Since the finger 83 is held down until the entire length of a carton has passed the rocker device 77, there is ample time for the connecting rod 67 to start on a working stroke before the finger 83 can be lifted into an idle position. Immediately upon the beginning of a working stroke, lever 65 is swung in the anti-clockwise direction about its pivot, causing the strip to be gripped and fed during the remainder of the working stroke. When the feeding devices start on their return stroke, the dog or pawl will drop back into its locking position and will remain there, if in the meantime the finger 83 has risen to the full line position in Fig. 17 and remains up. Whenever the trailing end of a carton passes beyond the rocker device 77, a spring 85, acting on the bell crank lever 78, operates the trip mechanism so as to cause the trip finger to be raised into and held in its idle position.

Each carton is preferably brought to rest upon reaching what may be termed the sealing position. Thus, in the arrangement shown, there are stationary guides 86 and 87 just beyond the transverse shaft 15, between which each carton is delivered after it has been closed. Lying outside of the guide 87 and pivotally connected thereto is a small bell crank lever 88 having at one end a lateral projection 89 that passes underneath the guide into the path of a carton. Attached to the other end of the bell crank lever is a connecting rod 90 that extends to and is pivotally connected with a swinging lever 91. A spring 92, acting on the lever 91, tends constantly to hold the parts in such positions that the element 89 lies in the path of the cartons, as shown in Fig. 10. The lever 91 has an arm 93 which, at this time, lies approximately parallel with the outer run of the sprocket chain 18. It will be seen that, in Fig. 10, one of the fingers 35 on the chain 18 is making the turn, having already left the end of the carton in advance thereof; this carton having been brought up against the stop element 89. As the finger 35 continues to move down and toward the left in Fig. 10 it strikes the arm 93 on the lever 91 and swings the lever in the direction to withdraw the stop element 89 from in front of the carton, so that the carton may continue along the machine. It is while the carton remains stationary against the stop element 89 that the end of the sealing strip is applied; the sealing strip being delivered out above the top of the carton in Fig. 10 about midway between the ends of the carton.

After the strip has been fed so that the end overlies the carton in the manner shown in Fig. 11, the portion that has passed beyond the shears must be cut off, and that part directly over the carton must be pressed down on the latter. I have already explained that the shears 60 and 61 sever the strip. The swinging blade of the shears is normally held raised by a torsion spring 95, shown in Fig. 17. The blade has thereon an upwardly projecting arm 96 having at its free end a cam roller 97 that engages with the periphery of a cam 98, as best shown in Fig. 13. The cam 98 is on a short transverse shaft 99 provided with a bevel gear wheel 100 that meshes with a complementary gear wheel 101 on the shaft 71 which drives the strip-feeding device. Therefore, during each revolution of the shaft 71, the shears are opened and closed; this being done in proper time relation to the reciprocation of the strip-feeding devices which complete a cycle for each revolution of the shaft 71.

The shaft 71 serves also to operate a presser device that presses the detached end of the strip, or wafer, against the top of the carton. This presser device, as best shown in Figs. 10 and 11 and in Fig. 17, consists of a pad or shoe 102 carried on the end of an arm 103 fixed to and projecting radially from a shaft 104 supported by the framework of the machine parallel with the shaft 71. The arm 103 is on one end of the shaft 104, whereas, on the other end of the shaft, there is a radial arm 105 which, as shown in Fig. 12, has thereon a cam roller 106. This cam roller engages with a cam 107 on the shaft 71 beside the bevel gear wheel 72. A torsion spring 108, surrounding the shaft 104, fixed at one end to the shaft and at the other end to a stationary part of the machine, tends constantly to hold the pad or shoe elevated, as shown in full lines in Fig. 11. As the cam 107 revolves it rocks the shaft 104 once during each revolution, causing the pad or shoe to be swung down into the position shown in dotted lines in Fig. 11. The downward movement of the pad or shoe may take place simultaneously with the downward movement of the shear blade 61 so that, as a sealing element or wafer f is cut from the end of the strip F, one end of the seal or wafer is pressed down on the cover of the carton, as shown in dotted lines in Fig. 11. There remains, then, only the folding or bending down of the overhanging portion of the seal or wafer f and pressing it against the front wall of the carton, in order to complete the operations.

When the carton reaches the seal-receiving position of Fig. 10, it has travelled as far as it can be driven by the sprocket chains 17 and 18. Therefore, additional driving means are required to carry the carton past the mechanism for attaching the overhanging end of the seal or wafer to the front wall of the carton. While the carton is still in its seal-receiving position, it is engaged at the top, adjacent to the guide 87, by a friction wheel 110 which is the first of a series of three, the others being indicated at 111 and 112, respectively; the wheel 110, as will be apparent from Fig. 14, being just above the forward end of the carton, namely, above the stop element 91. The top of the carton at this time is also engaged, toward the front and near the guide 86, by a longitudinal endless belt 113. The wheel 110 is fixed to a short transverse stub shaft 114. The wheel 111 is fixed to a long transverse shaft 116. The belt 113 passes over a pulley 117 on the shaft 116 and over a pulley 118 on a long transverse shaft 119 positioned between the shaft 114 and the seal-affixing shoe 102, as is best seen in Fig. 1. The shaft 115 drives a shaft 114 through a sprocket chain 120 and also drives the shaft 116 through a sprocket chain 121. The shaft 115 is driven from the chain 29, to which I have previously referred. This chain, as shown in Figs. 14 and 15, extends to a sprocket wheel on the lower end of a short vertical shaft 122 directly below the shaft 115. On the upper end of the shaft 122 is a bevel gear 123 meshing with a complementary gear 124 on the shaft 115. Therefore, whenever the machine is in operation, the wheels 110, 111 and 112 and the belt 113 are driven. It is desirable that the part of the wafer f that lies on top of the carton be held firmly in place until good adhesion is insured, I, therefore, place above and in contact with the lower run of the belt 113 a series of rollers 125 which are conveniently rotatably mounted in a suitable frame or carriage 126 mounted on the inner end of a bracket 127 fixed at its outer end to a stationary part of the framework of the machine at the side of the machine.

The protruding end of the wafer or seal may conveniently be folded down through contact with a stationary deflecting bar 128 lying just about opposite the series of rollers 125. As the carton is caried along, the protruding end of the wafer f passes underneath the deflector 128, as shown in Figs. 14 and 16, and is gradually swung down, as shown in Figs. 15 and 16, until, finally, it is laid flat against the front side of the carton. The deflector may conveniently be supported from the inner ends of transverse arms or bars 129 and 130 fixed at their outer ends to a stationary part of the machine at the side of the machine. The deflector 128 terminates near the short vertical shaft 122. On this shaft is a friction wheel 131 that engages with the front side of the carton near the top, and thus rolls the adjacent end of the seal or wafer firmly into contact with the front of the carton. After passing beyond the wheel 131, that portion of the seal or wafer that is on the front wall of the carton is further rolled and pressed by a series of short vertical rollers 132 similar to the rollers 125 and carried in a suitable frame or carriage 133 supported from a bracket 134 that extends inwardly from the side of the machine. The guide 86 terminates at about the point where the deflector 128 begins, but the guide 87 extends almost to the outlet end of the machine, at least to the shaft 116, so that the carton will be held in line by the guide 87 against which it will be pressed by the wheel 131 and the rollers 132.

When the carton finally emerges at the discharge end of the machine, it is closed and securely sealed.

It is believed that the operation of the machine has been sufficiently explained during the detailed description of the machine, and I shall, therefore, dwell only very briefly thereon. Open cartons are placed in the machine, are carried along and their covers closed, and each is then brought to rest while a wafer or seal is laid on top with an end protruding past the corner where the free end of the cover meets the body of the carton. The cartons are then carried farther, each wafer being bent or folded down against the side of the carton so that the carton is sealed and cannot be opened without destroying the wafer or seal. Cartons cannot be fed into the machine faster than the closing and sealing mechanism can handle them, because of the controlling dog at the entrance to the carton passage between the driving chains which insures that each carton will be far enough ahead of the next succeeding carton to permit each carton to remain at rest in the seal-receiving position the necessary length of time before the following carton catches up with it.

As heretofore explained, I have illustrated and described in detail only a single preferred form of machine adapted to close and seal a well known type of egg carton. There are, however, many other kinds of egg cartons and other cartons in connection with which my invention as to all or at least some of its features is applicable. I, therefore, do not desire to be limited to the details thus illustrated and described, or to a machine adapted to close a particular type of carton, or to a machine that both closes and seals a carton; but intend to cover all forms and arrangements that come within the definitions of my invention constituting the appended claims.

I claim:

1. A device for closing a cellular carton of the type having a row of triangular portions adjacent the front wall and a cover provided with a cover-locking strip having hooks thereon adapted to be engaged beneath said portions, comprising means for positioning an unclosed carton, means for bending the cover of the carton into substantially horizontal position, and means for progressively depressing said hooks beneath said portions.

2. A device for closing a cellular carton of the type having a row of hinge portions adjacent the front wall and a cover provided with a cover-locking strip having hooks adapted to be engaged beneath said portions, comprising positioning means for said carton, and means for progressively depressing the hooks on the cover-locking strip beneath said hinge portions, said last named means being operable to move said hooks away from said hinge portions during the closing operation to permit said hooks to be depressed therebeneath.

3. A device for closing a cellular carton of the type having a row of triangular portions adjacent the front wall and a cover provided with a cover-locking strip having hooks adapted to be engaged beneath said portions, comprising a traveling conveyor, means for positively moving an open carton with said conveyor, means for progressively rotating the cover of said carton into substantially horizontal position, and means for moving the hooks on the cover-locking strip of said carton backwardly with respect to the triangular portions of said carton and then downwardly therebeneath.

4. A device for closing a cellular carton of the type having cross partitions integrally joined to a front wall by a row of triangular portions adjacent the front wall and a cover provided with a cover-locking strip having hooks adapted to be engaged beneath said portions, comprising positioning means for an open carton, means for rotating the cover of said open carton into substantially horizontal position, and means for moving the hooks on the cover-locking strip of said cover away from the triangular portions of said carton and then downwardly therebeneath.

5. A device for closing a cellular carton of the type having front and rear walls, a plurality of cross partitions attached to the front wall by means of hinge portions, and a cover provided with a substantially vertical cover-locking marginal portion having hooks adapted to be engaged beneath said hinge portions, comprising positioning means for an unclosed carton, means for moving said hooks into a position out of alignment with the hinge portions on said cross partitions, and means for moving said hooks from said last named position into engagement with the hinge portions on said cross partitions.

6. A device for closing a cellular carton of the type having front and rear walls, a plurality of cross partitions extending between said walls and a cover joined to one of said walls and being provided with securing means along its free edge adapted to engage said cross partitions, comprising means for rotating the cover on said carton to closed position, and means for effecting engagement of the securing means along the free edge of the cover with said cross partitions to close the carton.

7. A device for closing a cellular carton of the type having front and rear walls, a plurality of cross partitions extending therebetween, and a cover hinged to one of said walls, comprising means for rotating said cover about a score line into substantially closed position, and means for engaging the free side of said cover with portions of said cross partitions to secure the carton in closed position.

8. A device for closing a cellular carton of the type having front and rear walls, a plurality of cross partitions extending between said walls, and a cover having securing means adapted to be engaged with portions on said cross partitions, comprising means for moving said cover into position adjacent said cross partitions with said securing means in a position corresponding to the position of said portions on the cross partitions, and additional means for moving said securing means into engagement with said portions on the cross partitions to secure said cover in closed position.

9. A device for closing a cellular carton of the type having front and rear walls, a plurality of cross partitions, and a cover having securing means adapted to be engaged with portions on said cross partitions, comprising means for moving said cover into position adjacent said cross partitions with said securing means in a position corresponding to the position of said portions on the cross partitions, and additional means for progressively moving said securing means into engagement with said portions on the cross partitions.

10. A device for closing a cellular carton of the type having front and rear walls, a plurality of cross partitions extending between said walls, and a cover having securing means adapted to be engaged with portions on said cross partitions, comprising means for progressing one of said cartons, stationary means along the path of travel of said carton for rotating the cover of the carton into position adjacent said cross partitions with said securing means in a position corresponding to the position of said portions on the cross partitions, and additional means along the path of travel of said carton for moving said securing means into engagement with said portions on the cross partitions to secure said cover in closed position.

MARTIN BURGER.